US011851552B2

(12) United States Patent
Gloger et al.

(10) Patent No.: US 11,851,552 B2
(45) Date of Patent: Dec. 26, 2023

(54) BIAXIALLY ORIENTED POLYPROPYLENE FILM WITH IMPROVED BREAKDOWN STRENGTH

(71) Applicant: BOREALIS AG, Vienna (AT)

(72) Inventors: Dietrich Gloger, Linz (AT); Hermann Braun, Linz (AT); Antonios Gitsas, Linz (AT); Davide Tranchida, Linz (AT); Franciscus Jacobs, Evergem (BE); Wolfram Stadlbauer, Linz (AT)

(73) Assignee: Borealis AG, Vienna (AT)

( * ) Notice: Subject to any disclaimer, the term of this patent is extended or adjusted under 35 U.S.C. 154(b) by 216 days.

(21) Appl. No.: 17/413,612

(22) PCT Filed: Dec. 20, 2019

(86) PCT No.: PCT/EP2019/086504
§ 371 (c)(1),
(2) Date: Jun. 14, 2021

(87) PCT Pub. No.: WO2020/127861
PCT Pub. Date: Jun. 25, 2020

(65) Prior Publication Data
US 2022/0033631 A1 Feb. 3, 2022

(30) Foreign Application Priority Data
Dec. 20, 2018 (EP) .................................... 18214673

(51) Int. Cl.
| | |
|---|---|
| C08L 23/12 | (2006.01) |
| B29C 48/00 | (2019.01) |
| B29C 55/16 | (2006.01) |
| C08J 5/18 | (2006.01) |
| C08L 23/14 | (2006.01) |
| C08L 23/20 | (2006.01) |
| H01G 4/18 | (2006.01) |
| B29K 23/00 | (2006.01) |
| B29L 9/00 | (2006.01) |

(52) U.S. Cl.
CPC ............ *C08L 23/12* (2013.01); *B29C 48/022* (2019.02); *B29C 55/16* (2013.01); *C08J 5/18* (2013.01); *C08L 23/142* (2013.01); *C08L 23/20* (2013.01); *H01G 4/18* (2013.01); *B29K 2023/12* (2013.01); *B29K 2023/14* (2013.01); *B29K 2023/18* (2013.01); *B29L 2009/003* (2013.01); *C08L 2203/16* (2013.01); *C08L 2205/025* (2013.01); *C08L 2205/03* (2013.01)

(58) Field of Classification Search
CPC ................................ B29C 55/16; C08L 23/12
See application file for complete search history.

(56) References Cited

U.S. PATENT DOCUMENTS

| | | |
|---|---|---|
| 9,093,219 B2 | 7/2015 | Sugata et al. |
| 9,637,602 B2 | 5/2017 | Potter et al. |
| 9,670,293 B2 | 6/2017 | Reznichenko et al. |
| 9,670,347 B2 | 6/2017 | Tölsch et al. |
| 9,708,481 B2 | 7/2017 | Wang et al. |
| 9,745,431 B2 | 8/2017 | Potter et al. |
| 9,751,962 B2 | 9/2017 | Wang et al. |
| 9,777,142 B2 | 10/2017 | Sandholzer et al. |
| 9,802,394 B2 | 10/2017 | Cavacas et al. |
| 9,828,698 B2 | 11/2017 | Wang et al. |
| 9,890,275 B2 | 2/2018 | Sandholzer et al. |
| 9,976,020 B2 | 5/2018 | Nummila-Pakarinen et al. |
| 10,011,708 B2 | 7/2018 | Lampela et al. |
| 10,030,109 B2 | 7/2018 | Boragno et al. |
| 10,040,930 B2 | 8/2018 | Gloger et al. |
| 10,100,185 B2 | 10/2018 | Wang et al. |

(Continued)

FOREIGN PATENT DOCUMENTS

| | | |
|---|---|---|
| CN | 103764693 A | 4/2014 |
| CN | 106604962 A | 4/2017 |

(Continued)

OTHER PUBLICATIONS

*Electrical Degradation and Breakdown in Polymers*, Part 4, Stochastic Nature of Breakdown, Chapter 14, pp. 317-355, and "Stochastic Models of Breakdown," Chapter 15, pp. 356-421, IEEE Materials and Devices Series 9, LA Dissado and JC Fothergill, Editors, Peter Peregrinus Ltd., 1992 (125 pgs.).

(Continued)

*Primary Examiner* — Jeffrey C Mullis
(74) *Attorney, Agent, or Firm* — Leydig, Voit & Mayer, Ltd.

(57) ABSTRACT

The present invention is directed to a biaxially oriented polypropylene (BOPP) film with improved breakdown strength and to a capacitor comprising an insulation film comprising a layer of the biaxially oriented polypropylene film of the present invention. The present invention is further directed to a process for producing a biaxially oriented polypropylene film. Finally, the present invention is further directed to the use of a biaxially oriented polypropylene film of the present invention as layer of an insulation film of a capacitor. The BOPP film comprises a polypropylene composition, wherein the polypropylene composition comprises a high isotactic homopolymer of propylene and a polymeric α-nucleating agent. The BOPP film has a dielectric breakdown field strength $Eb63.2$ of at least 595 kV/mm. The process for producing a biaxially oriented polypropylene film comprises the steps of extruding a polypropylene composition to a flat film and orienting the flat film simultaneously in the machine direction and in the transverse direction.

15 Claims, 1 Drawing Sheet

(56) References Cited

U.S. PATENT DOCUMENTS

| | | | |
|---|---|---|---|
| 10,100,186 B2 | 10/2018 | Wang et al. |
| 10,227,427 B2 | 3/2019 | Reichelt et al. |
| 10,256,041 B2 | 4/2019 | Tamura et al. |
| 10,450,451 B2 | 10/2019 | Wang et al. |
| 10,519,259 B2 | 12/2019 | Resconi et al. |
| 10,870,718 B2 | 12/2020 | Denifl et al. |
| 11,292,900 B2 | 4/2022 | Gahleitner et al. |
| 11,299,617 B2 | 4/2022 | Prieto et al. |
| 11,390,732 B2 | 7/2022 | Van Houcke et al. |
| 11,492,478 B2 | 11/2022 | Kniesel et al. |
| 11,504,949 B2 | 11/2022 | Oderkerk et al. |
| 11,518,863 B2 | 12/2022 | Vijay |
| 11,530,321 B2 | 12/2022 | Kniesel et al. |
| 2013/0170096 A1 | 7/2013 | Sugata et al. |
| 2014/0142241 A1 | 5/2014 | Chou |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |
| 2017/0029980 A1 | 2/2017 | Wang et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313867 A1 | 11/2017 | Lampela et al. |
| 2017/0321048 A1 | 11/2017 | Nummila-Pakarinen et al. |
| 2018/0079875 A1 | 3/2018 | Braun et al. |
| 2018/0194881 A1 | 7/2018 | Denifl et al. |
| 2018/0286588 A1 | 10/2018 | Tamura et al. |
| 2018/0298172 A1 | 10/2018 | Gitsas et al. |
| 2020/0263015 A1 | 8/2020 | Kniesel et al. |
| 2020/0270434 A1 | 8/2020 | Van Houcke et al. |
| 2020/0277479 A1 | 9/2020 | Jerabek et al. |
| 2020/0308353 A1 | 10/2020 | Jerabek et al. |
| 2020/0347216 A1 | 11/2020 | Kniesel et al. |
| 2020/0392321 A1 | 12/2020 | Gahleitner et al. |
| 2021/0114352 A1 | 4/2021 | Oderkerk et al. |
| 2021/0171749 A1 | 6/2021 | Kumar et al. |
| 2021/0171750 A1 | 6/2021 | Gahleitner et al. |
| 2021/0214527 A1 | 7/2021 | Gahleitner et al. |
| 2021/0214533 A1 | 7/2021 | Kulshreshtha et al. |
| 2021/0238376 A1 | 8/2021 | Kahlen et al. |
| 2021/0253836 A1 | 8/2021 | Gahleitner et al. |
| 2021/0269560 A1 | 9/2021 | Krallis et al. |
| 2021/0324189 A1 | 10/2021 | Prieto et al. |
| 2021/0332227 A1 | 10/2021 | Wang et al. |
| 2021/0347971 A1 | 11/2021 | Wang et al. |
| 2022/0033631 A1 | 2/2022 | Gloger et al. |
| 2022/0135779 A1 | 5/2022 | Wang et al. |
| 2022/0204719 A1 | 6/2022 | Vijay |
| 2022/0227965 A1 | 7/2022 | Ruemer et al. |
| 2022/0251256 A1 | 8/2022 | Wang et al. |
| 2022/0289955 A1 | 9/2022 | Kahlen et al. |
| 2022/0306844 A1 | 9/2022 | Kahlen et al. |
| 2022/0315716 A1 | 10/2022 | Prieto et al. |
| 2022/0356330 A1 | 11/2022 | Kahlen et al. |

FOREIGN PATENT DOCUMENTS

| | | |
|---|---|---|
| CN | 108137833 A | 6/2018 |
| EP | 0 227 300 A2 | 7/1987 |
| EP | 1 801 155 A1 | 6/2007 |
| EP | 1 801 157 A1 | 6/2007 |
| EP | 1 818 365 A1 | 8/2007 |
| EP | 2 543 684 A1 | 1/2013 |
| EP | 2 995 641 A1 | 3/2016 |
| JP | 2005-064067 A | 3/2005 |
| JP | 2008-127460 A | 6/2008 |
| JP | 2010-024354 A | 2/2010 |
| KR | 20140054348 A | 5/2014 |
| KR | 20170062448 A2 | 6/2017 |
| KR | 20180061328 A | 6/2018 |
| WO | 99/24479 A1 | 5/1999 |
| WO | 00/68315 A1 | 11/2000 |
| WO | 2012/002123 A | 1/2012 |
| WO | 2014/205624 A1 | 12/2014 |
| WO | 2015/091839 A1 | 6/2015 |
| WO | 2016/159044 A1 | 10/2016 |
| WO | 2017/064224 A1 | 4/2017 |

OTHER PUBLICATIONS

Japan Patent Office, Notice of Reasons for Rejection in Japanese Patent Application No. 2021-534152 (dated Jun. 28, 2022).

Korean Intellectual Property Office, Notice to Submit a Response issued in a Korean Patent Application No. 10-2021-7021730 (dated Dec. 7, 2022).

The Patent Office of the People's Republic of China, First Notification of Office Action issued in Chinese Patent Application No. 201980083074.7 (dated Jan. 13, 2023).

Boggs et al., "Overview of Laminar Dielectric Capacitors," *IEEE Electrical Insulation Magazine* 26(2): 7-13 (2010).

Busico et al., "Alk-1-ene Polymerization in the Presence of a Monocyclopentadienyl Zirconium(IV) Acetamidinate Catalyst: Microstructural and Mechanistic Insights[a]," *Macromol. Rapid Commun.* 28: 1128-1134 (2007).

Busico et al., "Full Assignment of the $^{13}$C NMR Spectra of Regioregular Polypropylenes: Methyl and Methylene Region," *Macromolecules* 30: 6251-6263 (1997).

Busico et al., "Microstructure of polypropylene," *Prog. Polym. Sci.* 26: 443-533 (2001).

Chen et al., "The Influence of Defects on the Short-Term Breakdown Characteristics and Long-Term dc Performance of LDPE Insulation," *IEEE Transactions on Electrical Insulation* 7(3): 401-407 (2000).

Cheng, "$^{13}$C NMR Analysis of Ethylene-Propylene Rubbers," *Macromolecules* 17: 1950-1955 (1984).

Faß et al., "New BOPP Capacitor Film for Metallization with Improved Performance at Higher Temperatures", CARTS—Europe 2000—14th European Passive Components Symposium 2000, pp. 195-203.

Kerwien et al., "Large Area DC Dielectric Breakdown Voltage Measurement of BOPP and PTFE Thin Films," *IEEE Conference on Insulation and Dielectric Phenomena 2016*, pp. 486-489.

Krentz et al., "Morphologically dependent alternating-current and direct-current breakdown strength in silica-polypropylene nanocomposites," *Journal of Applied Polymer Science* 134(1): 44347 (2017) 10 pgs.

Laihonen et al., "DC Breakdown Strength of Polypropylene Films: Area Dependence and Statistical Behaviour", *IEEE Transactions on Dielectrics and Electrical Insulation* 14(2): 275-285 (2007).

Laihonen et al. "Area Dependence of Breakdown Strength of Polymer Films: Automatic Measurement Method." *IEEE Transactions on Dielectrics and Electrical Insulation* 14(2): 263-274 (2007).

Resconi et al., "Selectivity in Propene Polymerization with Metallocene Catalysts," *Chem. Rev.* 100(4):1253-1345 (2000).

Rytöluoto et al., "Large-area Dielectric Breakdown Performance of Polymer Films—Part I: Measurement Method Evaluation and Statistical Considerations on Area-dependence," *IEEE Transactions on Dielectrics and Electrical Insulation* 22(2): 689-700 (2015).

Rytöluoto et al., "Effect of film structure and morphology on the dielectric breakdown characteristics of cast and biaxially oriented polypropylene films," *European Polymer Journal* 95: 606-624 (2017).

Rytöluoto et al., "Effect of Film Thickness and Electrode Area on the Dielectric Breakdown Characteristics of Metallized Film Capaci-

(56) References Cited

OTHER PUBLICATIONS tor Films," *Nordic Insulation Symposium—Nord-IS 13*, Trondheim, Norway, Jun. 9-12, 2013, pp. 33-38.

Rytöluoto et al., New Approach to Evaluate Area-Dependent Breakdown Characteristics of Dielectric Polymer Films, *IEEE Transactions on Dielectrics and Electrical Insulation* 20(3): 937-946 (2013).

Rytöluoto et al., DC Ramp Rate Effect on the Breakdown Response of SiO2-BOPP Nanocomposites, *2015 IEEE 11th International Conference on the Properties and Applications of Dielectric Materials (ICPADM)*, pp. 496-499.

Rytöluoto, "Large-Area Multi-Breakdown Characterization of Polymer Films: A New Approach for Establishing Structure-Processing-Breakdown Relationships in Capacitor Dielectrics," Thesis for the degree of Doctor of Science in Technology Tampere University of Technology. Publication; vol. 1356 (Jan. 8, 2016).

Rytöluoto et al., "The Role of Film Processing in the Large-Area Dielectric Breakdown Performance of Nano-Silica-BOPP Films," *Nordic Insulation Symposium—Nord-IS 15*, pp. 63-68 (2015).

Rytöluoto et al., "Large-area Dielectric Breakdown Performance of Polymer Films—Part II: Interdependence of Filler Content, Processing and Breakdown Performance in Polypropylene-Silica Nanocomposites," *IEEE Transactions on Dielectrics and Electrical Insulation* 22(4): 2196-2206 (2015).

Rytöluoto et al., "Effect of Inter-Layer Pressure on Dielectric Breakdown Characteristics of Metallized Polymer Films for Capacitor Applications," *Proceedings of IEEE International Conference on Solid Dielectrics (ICSD)*, pp. 682-687 (2013).

Rytöluoto et al., "Influence of Low Amounts of Nanostructured Silica and Calcium Carbonate Fillers on the Large-Area Dielectric Breakdown Performance of Bi-axially Oriented Polypropylene," *2014 IEEE Conference on Electric Insulation and Dielectric Phenomena (CEIDP)*, pp. 655-658 (2014).

Wang et al., "Structural Analysis of Ethylene/Propylene Copolymers Synthesized with a Constrained Geometry Catalyst," *Macromolecules* 33: 1157-1162 (2000).

Xu et al., "Automatic Breakdown Voltage Measurement of Polymer Films," *IEEE Electrical Insulation Magazine* 24(6): 30-34 (2008).

Zhou et al., "A new decoupling method for accurate quantification of polyethylene copolymer composition and triad sequence distribution with $^{13}$C NMR," *J. Magnet. Reson.* 187: 225-233 (2007).

European Patent Office, International Search Report in International Application No. PCT/EP2019/086504 (dated Mar. 16, 2020).

European Patent Office, Written Opinion in International Application No. PCT/EP2019/086504 (dated Mar. 16, 2020).

International Bureau of WIPO, International Preliminary Report on Patentability in International Application No. PCT/EP2019/086504 (dated Jun. 16, 2021).

Junhui et al., *Chemistry and Physics of Polymers*, China Light Industry Press, First Edition, p. 182 (2010).

Zhigang et al., *Plastic flexible packaging Materials*, Cultural Development Press, First Edition, pp. 69-71 (2018).

The Patent Office of the People's Republic of China, Second Notification of Office Action issued in Chinese Patent Application No. 201980083074.7 (dated Jul. 8, 2023).

Korean Intellectual Property Office, Notice of Allowance issued in Korean Patent Application No. 10-2021-7021730 (dated Aug. 22, 2023).

Figure 1A
Figure 1B
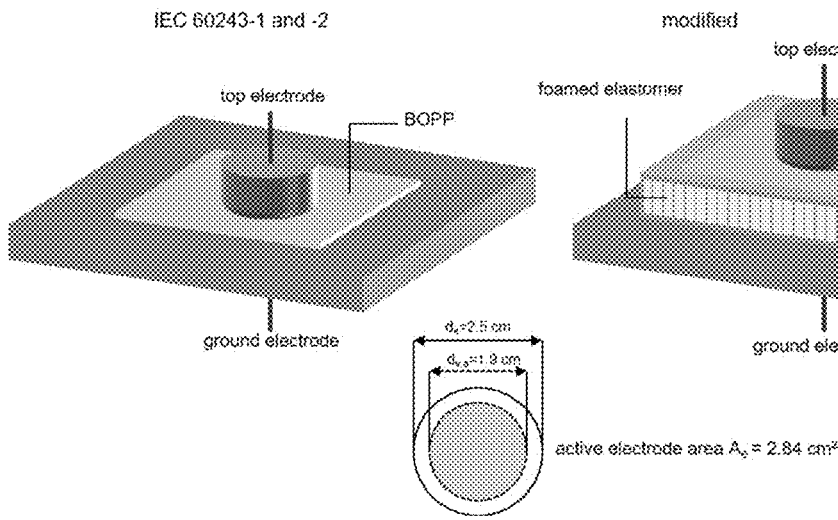
Figure 1C
Figure 2
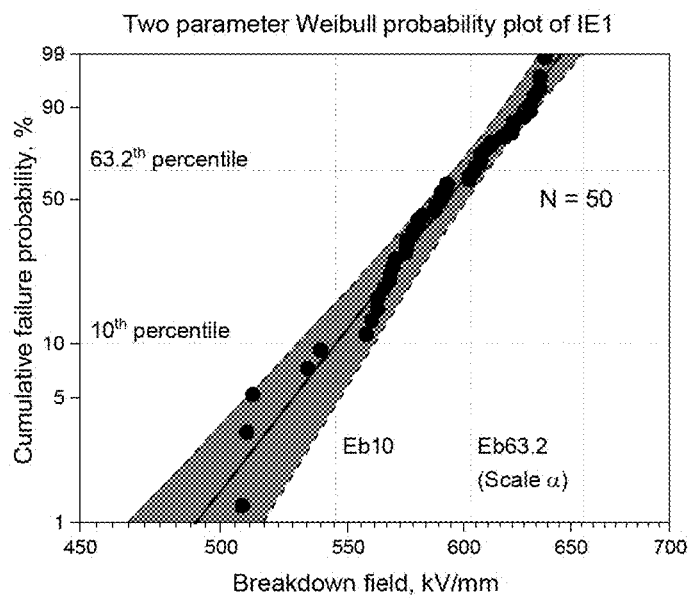

though only one or all might occur in
BIAXIALLY ORIENTED POLYPROPYLENE FILM WITH IMPROVED BREAKDOWN STRENGTH The present invention is directed to a biaxially oriented polypropylene (BOPP) film with improved dielectric breakdown field strength and to a capacitor comprising an insulation film comprising a layer of the biaxially oriented polypropylene film of the present invention. The present invention is further directed to a process for producing a biaxially oriented polypropylene film. Finally, the present invention is further directed to the use of a biaxially oriented polypropylene film of the present invention as layer of an insulation film of a capacitor.

Polypropylene is used in many applications and is for instance the material of choice in the field of film capacitors as its chain lacks any kind of polar groups which orient under electrical field stress. Various types of electric equipment contain inverters and accordingly demands have been growing for capacitors smaller in size and enhanced in capacitance.

Because of these demands from the market, biaxially oriented polypropylene films which are thinner and improved in both mechanical properties and electrical properties are preferably used in the field of capacitor applications.

Capacitor films must withstand extreme conditions like high temperatures and must have high dielectrical breakdown field strength. Additionally it is appreciated that capacitor films possess good mechanical properties like a high stiffness and also high operating temperatures. Many capacitor film grades, namely for power applications such as welding, e-vehicles, trains, ovens, wind mills, solar panels etc, are using high isotactic polypropylene (HIPP) resins. Apart from balanced shrinkage and optimised surface roughness, the main advantage associated with the high isotacticity is the high heat resistance of the final film, relating to the high crystallinity, the high onset temperature of the melting and the high peak melting temperature. There are also capacitor film grades based on high isotactic polypropylene resins wherein the underlying polyolefin composition contains in addition long-chain branched polypropylene.

In general, the phenomenon of dielectric breakdown as a physical process is not entirely understood, and correlations between structure of the insulator (morphology) and dielectric strength are not well established.

Dielectric breakdown occurs when the electrical field applied to an insulator exceeds the dielectric breakdown field strength of the insulator, and when a current spark breaks through the material, causing a short circuit. In the laboratory, breakdown testing is usually done in a sandwich set-up of electrode/specimen/electrode, using a voltage ramp that leads to breakdown within several seconds, and while this is referred to as short-term breakdown test, breakdown after several seconds is already a long time relative to electronic processes and by some authors considered dielectric degradation, or even aging.

Using such a test, the generation of reliable breakdown data, and the assessment of average dielectric strength of a material are yet non-trivial, for several reasons. The primary reason seems to be related to the fact that the breakdown event is the final result of several degradative processes on nano and microscopic scale, and this results in stochastic behaviour. Numerous factors influence final breakdown strength such as temperature, humidity, electrode metal, electrode geometry (shape, area), voltage raise rate, DC or AC voltage, surface roughness and thickness of the specimen. Moreover, depending on relative influence of the many factors for a given test, or for a given progress stage of the breakdown process, the breakdown can occur by several different mechanisms such as partial discharge in voids, thermal breakdown by hot spot formation and electromechanical breakdown, of which only one or all might occur in one measurement session.

Ultimately, the above leads to the requirement for numerous individual measurements on identically prepared specimens, which yet produce breakdown populations with wide dispersion, and usually non-Gaussian behaviour. For these reasons, academic research (see below) has focused on the development of automatic breakdown measurement methods to generate large data sets with good reproducibility, and modelling the data sets with extreme value statistics, usually the Weibull distribution.

Academic research in this field is reported in:

Laihonen S J, Gafvert U, Schutte T, Gedde U W, "DC breakdown strength of polypropylene films: Area dependence and statistical behaviour", IEEE Transactions on Dielectrics and Electrical Insulation, 2007, 14(2)

Xu C, Ho J, Boggs S A, "Automatic breakdown voltage measurement of polymer films", IEEE Electrical Insulation Magazine, 2008 Nov., 24(6)

Rytoluoto I, Lahti K, Karttunen M, Koponen M, "Large-area dielectric breakdown performance of polymer films-part i: measurement method evaluation and statistical considerations on area-dependence", IEEE Transactions on Dielectrics and Electrical Insulation, 2015, 22(2), 689-700

Faβ R, Kochem K H, Müller-Nagel, K, "New BOPP capacitor film for metallization with improved performance at higher temperatures", 14th European Passive Components Symposium, (Charts-Europe 2000), 2000, 195-203

EP 2 995 641 A1 discloses a polypropylene composition with improved processability and heat resistance for use in a capacitor film, in particular a biaxially oriented polypropylene film made thereof, wherein the polypropylene composition comprises a high isotactic propylene homopolymer, a long chain branched polypropylene, and a β-nucleating agent.

WO 2017/064224 A1 discloses biaxially oriented polypropylene films with improved electrical properties which are suitable for capacitors, wherein the underlying polypropylene composition comprises a high isotactic homopolymer of propylene and a polymeric α-nucleating agent.

There is nevertheless still a need for providing films with improved electrical properties which are suitable for capacitors and/or for allowing for high throughput.

It is therefore an object of the present invention to provide biaxially oriented polypropylene films suitable for capacitors with still improved electrical properties, which may especially have for example improved long term stability.

BRIEF DESCRIPTION OF THE DRAWINGS

FIG. 1A illustrates IEC 60243-1 and -2 electrode design used herein. FIG. 1B illustrates a modified variant of the electrode design illustrated in FIG. 1A. FIG. 1C depicts the electrode design used in WO 2017/064224 A1.

FIG. 2 illustrates the breakdown distribution of Inventive Example 1 as a two-parameter Weibull probability plot: Experimental data (dots), linear regression through the data (solid line) and 95% confidence interval (shaded area limited by dashed lines).

DETAILED DESCRIPTION OF THE INVENTION

The present invention is based on the finding that the object can be solved by provision of a novel biaxially oriented polypropylene film comprising a polypropylene composition, wherein the polypropylene composition comprises a high isotactic polypropylene resin and a polymeric α-nucleating agent. The biaxially oriented polypropylene film according to the present invention has the advantage of having a very high dielectric breakdown field strength.

The present invention is accordingly in one aspect directed to a biaxially oriented polypropylene film, especially for example for production in a continuous process, comprising a polypropylene composition, wherein the polypropylene composition comprises
(i) from 90 to 99.99 wt %, based on the total weight of the polypropylene composition, of a homopolymer of propylene having a content of isotactic pentad fraction of from 93 to 98% and a melt flow rate $MFR_2$ of from 0.4 to 10 g/10 min, and
(ii) from 0.0000001 to 1 wt %, based on the total weight of the polypropylene composition, of a polymeric α-nucleating agent,
wherein the biaxially oriented polypropylene film
has a dielectric breakdown field strength Eb63.2 of at least 595 kV/mm, which is obtained as the Scale parameter α of a fitted two-parameter Weibull distribution based on 50 results, measured with active electrode area of 2.84 cm² using 250 V/s DC voltage ramp rate on films with a thickness of 3.8-4.2 μm, and
preferably has a thickness of 2 to 5 μm, wherein further the film is stretched simultaneously in machine direction and transverse direction.

The components (i) and (ii) and/or optionally (iii) may thereby preferably add up to 100 wt %, which may mean that the amount of the components (i) and (ii) and/or optionally (iii) are selected in the given ranges so that they add up to 100 wt % of said components or of the composition.

The homopolymer of propylene (i) will in the following shortly referred to also as high isotactic homopolymer of propylene.

The expression homopolymer of propylene as used herein relates to a polypropylene that consists substantially, i.e. of at least 99.5 wt %, more preferably of at least 99.8 wt %, of propylene units. In a preferred embodiment only propylene units are detectable in the homopolymer of propylene. The comonomer content can be determined with $^{13}C$ NMR spectroscopy, as described below. Further, it is appreciated that the homopolymer of propylene is a linear polypropylene.

The film may thereby have a thickness for example between >2 and <5 μm, preferably >2 and 4.5 μm or 3 to 5 μm, preferably of 3.5 to 4.5 μm.

High Isotactic Homopolymer of Propylene

The high isotactic homopolymer of propylene (i) is the main constituent of the polypropylene composition. The polypropylene composition comprises from 90 to 99.99 wt %, preferably from 95 to 99.9 wt %, more preferably from 98 to 99.99 wt % and in particular from 99 to 99.9 wt % of the high isotactic homopolymer of propylene (i).

The high isotactic homopolymer of propylene (i) has a melt flow rate $MFR_2$ of from 0.4 to 10 g/10 min, preferably from 1 to 7 g/10 min. A too low MFR has a consequence of poor processability. On the other hand, a too high MFR has the consequence of sagging at the elevated temperatures used in the process of producing a biaxially oriented polypropylene film.

The high isotactic homopolymer of propylene (i) has a content of isotactic pentad fraction (mmmm-fraction) of from 93 to 98%, preferably from 94 to 98%, such as from 95 to 98%. The content of the isotactic pentad fraction is calculated as the percentage of the mmmm-pentads from all the pentads. A too low content of isotactic pentad fraction has a consequence that the final crystallinity of the film becomes rather low and the tensile properties and moduli of the film decrease. On the other hand, a too high content of isotactic pentad fraction has the consequence that there may be frequent film breaks during film orientation in machine direction and/or transverse direction.

The high isotactic homopolymer of propylene (i) preferably has an ash content of not more than 30 ppm, more preferably not more than 20 ppm and in particular not more than 15 ppm, such as not more than 10 ppm. Too high ash content could be detrimental for the dielectric properties of the film, especially if the ash contains metal residues. Such films cannot be used for making capacitors. The ash content of the high isotactic homopolymer of propylene (i) will be usually at least 1 ppm.

A process which is particularly effective in producing propylene homopolymers which are suitable for making the films of the present invention, e.g. the high isotactic homopolymer of propylene (i), is disclosed in EP-A-2543684, where a catalyst based on a solid component comprising titanium trichloride is used in combination with an aluminium alkyl, organic ether and an alkyl methacrylate.

The polymerisation is conveniently conducted in slurry. In such a process the catalyst, hydrogen and propylene monomer are contacted in a diluent comprising essentially one or more alkanes having from 4 to 15 carbon atoms, preferably from 10 to 14 carbon atoms. By "comprising essentially" is hereby meant that the diluent comprises at least 90 wt %, preferably at least 95 wt % and more preferably at least 99 wt % of one or more of such alkanes.

The polymerisation is typically conducted at a temperature of from 50 to 100° C., preferably at 60 to 80° C., and a pressure of from 1 to 50 bar, preferably from 3 to 15 bar.

Preferably, the process comprises one or more washing steps. Washing is typically conducted by contacting polymer slurry with a hydrocarbon diluent in one or more steps.

After the contacting step the excess diluent is typically removed, for instance by centrifuging. Preferably the polymer slurry is contacted with the hydrocarbon diluent in at least two steps. When the washing includes multiple steps, it is preferred that in at least one step an alcohol or an ether is present in addition to the hydrocarbon diluent. This facilitates the removal of the catalyst components from the polymer and thereby a polymer with very low ash content can be obtained.

Polymeric α-Nucleating Agent

The polypropylene composition comprises a polymeric α-nucleating agent (ii). The polymeric α-nucleating agent (ii) is a polymer of a vinyl compound of the formula $CH_2=CH-CHR^6R^7$, wherein $R^6$ and $R^7$ together form a 5- or 6-membered saturated, unsaturated, or aromatic ring, or independently represent an alkyl group comprising 1 to 4 carbon atoms. Preferably, the polymeric α-nucleating agent (ii) is a homopolymer of the vinyl compound of the formula $CH_2=CH-CHR^6R^7$.

The polypropylene composition comprises from 0.0000001 to 1 wt % of the polymeric α-nucleating agent (or, from 0.001 ppm to 10,000 ppm), preferably from 0.000001 to 0.01 wt % (or, from 0.01 ppm to 100 ppm), and especially preferably from 0.000001 to 0.005 wt % (or, from 0.01 ppm to 50 ppm) of the polymeric α-nucleating agent (ii). In particular, the polypropylene composition comprises from 0.000001 to 0.001 wt % (or, from 0.01 ppm to 10 ppm), and even more preferably from 0.000001 to 0.0005 wt % (or, from 0.01 ppm to 5 ppm) of the polymeric α-nucleating agent (ii), based on the total weight of the polypropylene composition.

One method for incorporating the polymeric α-nucleating agent (ii) into the polypropylene composition includes prepolymerising the polymerisation catalyst by contacting the catalyst with the vinyl compound of the formula $CH_2=CH—CHR^6R^7$, wherein $R^6$ and $R^7$ together form a 5- or 6-membered saturated, unsaturated, or aromatic ring, or independently represent an alkyl group comprising 1 to 4 carbon atoms. Propylene is then polymerised in the presence of such prepolymerised catalyst.

In the prepolymerisation the catalyst is prepolymerised so that it contains up to 5 grams of prepolymer per gram of solid catalyst component, preferably from 0.1 to 4 grams of prepolymer per gram of the solid catalyst component. Then, the catalyst is contacted at polymerisation conditions with the vinyl compound of the formula $CH_2=CH—CR^6R^7$, wherein $R^6$ and $R^7$ are as defined above.

Especially preferably $R^6$ and $R^7$ are both methyl groups and the vinyl compound is accordingly 3-methyl-1-butene.

Especially preferably $R^6$ and $R^7$ form a saturated 5- or 6-membered ring. Especially preferably the vinyl compound is vinylcyclohexane.

Especially preferably the catalyst contains from 0.5 to 2 grams of the polymerised vinyl compound, such as poly(vinylcyclohexane), per gram of solid catalyst component.

Especially preferably the polymeric α-nucleating agent is selected from the group consisting of polyvinylcyclohexane, poly(3-methyl-1-butene) and mixtures thereof.

This approach allows the preparation of nucleated polypropylene as disclosed in EP-A-607703, EP-A-1028984, EP-A-1028985 and EP-A-1030878.

The polymeric α-nucleating agent according to the present invention is not a polymer of propylene.

Preferably, the prepolymerisation is conducted in slurry in an inert diluent at a temperature within the range of from 20 to 80° C., preferably from 35 to 65° C. The pressure is not critical and can be selected from an atmospheric pressure to 50 bar. The reaction time is selected so that the amount of unreacted vinyl compound is less than a predetermined limit, such as less than 2000 ppm of the reaction mixture, or less than 1000 ppm.

As described above, after prepolymerising the polymerisation catalyst, propylene is polymerised in the presence of such prepolymerised catalyst which approach allows the preparation of nucleated polypropylene.

Hence, according to one possible method the polypropylene composition is produced by homopolymerising propylene in the presence of such prepolymerised catalyst. The propylene homopolymer is thereby nucleated by the polymeric α-nucleating agent (ii). The polypropylene composition then preferably comprises from 0.1 to 200 ppm of the polymeric α-nucleating agent (ii), preferably poly(vinylcyclohexane), based on the total weight of the polypropylene composition. The polymerisation process and the catalyst are then suitably as described above. Thereby the high isotactic homopolymer of propylene (i) is formed on the catalyst containing the polymeric α-nucleating agent (ii).

Alternatively, and more preferably, the polypropylene composition is produced by homopolymerising propylene in the presence of a polymerisation catalyst which has not been prepolymerised with the vinyl compound as disclosed above, thereby producing the high isotactic homopolymer of propylene (i). In such a case the high isotactic homopolymer of propylene (i) is combined before or at the extrusion step with a further polymer, namely a propylene homo- or copolymer (iii) which has been produced by homopolymerising propylene, or copolymerising propylene and a comonomer, in the presence of a catalyst which has been prepolymerised with the vinyl compound as referred to above.

Propylene Homo- or Copolymer

Hence, according to a preferred embodiment of the present invention, the polypropylene composition further comprises (iii) up to 9.99 wt %, based on the total weight of the polypropylene composition, of a propylene homo- or copolymer other than the homopolymer of propylene (i), i.e. other than the high isotactic homopolymer of propylene (i).

The amount of the propylene homo- or copolymer (iii) will be usually at least 0.01 wt %, based on the total weight of the polypropylene composition.

As discussed above, the propylene homo- or copolymer (iii) is typically present as a carrier polymer for the polymeric α-nucleating agent (ii). The propylene homo- or copolymer (iii) preferably comprises from 0.5 to 200 ppm, preferably from 0.5 to 100 ppm, more preferably from 1 to 200 ppm, such as 1 to 100 ppm, of the polymeric α-nucleating agent (ii), preferably of poly(vinylcyclohexane), based on the weight of the propylene homo- or copolymer (iii).

The amount of the homo- or copolymer of propylene (iii) is preferably from 0.1 to 9.99 wt %, based on the polypropylene composition, preferably from 0.1 to 5 wt %, more preferably from 0.2 to 4.99 wt %, even more preferably from 0.2 to 1.99 wt %, and in particular from 0.2 to 0.99 wt %, based on the polypropylene composition.

The propylene homo- or copolymer (iii) may be any homo- or copolymer of propylene. Preferably, the homo- or copolymer (iii) is relatively similar to the high isotactic homopolymer of propylene (i). Thus, it is preferred that the homo- or copolymer (iii) is a homopolymer of propylene. Furthermore, if the properties of the homo- or copolymer (iii) are substantially different from those of the high isotactic homopolymer of propylene (i), it is preferred that the amount of the homo- or copolymer (iii) does not exceed 2 wt %, based on the total weight of the polypropylene composition.

The propylene homo- or copolymer (iii) preferably has a branching index g of at least 0.9. Thereby the propylene homo- or copolymer (iii) is preferably substantially free of long chain branches. Especially, the propylene homo- or copolymer (iii) does not contain long chain branches in a detectable amount.

The propylene homo- or copolymer (iii) can be produced according to the methods known in the art. As described above, according to one method the propylene homo- or copolymer (iii) is produced by homopolymerising propylene in the presence of a catalyst which is prepolymerised with a vinyl compound of the formula $CH_2=CH—CHR^6R^7$, wherein $R^6$ and $R^7$ are as defined above. It is particularly preferred that the vinyl compound is vinylcyclohexane. The propylene homo- or copolymer (iii) is thereby nucleated by the polymeric α-nucleating agent (ii). The propylene homo- or copolymer (iii) preferably comprises from 0.1 to 200 ppm of the polymeric α-nucleating agent (ii), preferably of poly(vinylcyclohexane), based on the total weight of the propylene homo- or copolymer (iii).

According to one suitable embodiment of the present invention, the polymerisation process and the catalyst for producing the propylene homo- or copolymer (iii) are similar to what is described above for the high isotactic homopolymer of propylene (i). Thereby the propylene homo- or copolymer (iii) is formed on the catalyst containing the polymeric α-nucleating agent (ii).

According to an especially preferred embodiment of the present invention, the propylene homo- or copolymer (iii) is produced by homopolymerising propylene, or copolymerising propylene and one or more comonomers selected from the group consisting of ethylene and alpha-olefins having from 4 to 8 carbon atoms, in the presence of a Ziegler-Natta catalyst comprising a solid component containing magnesium, titanium, chlorine, and of an internal donor, such as a phthalate, a maleate or a citraconate, and of an aluminium alkyl, such as triethylaluminium, and of an external donor, such as a silicon ether, for instance, dicyclopentyldimethoxysilane, which catalyst has been prepolymerised with a small amount of the vinyl compound of the formula $CH_2=CH-CHR^6R^7$, such as vinylcyclohexane.

Propylene is then homopolymerised or copolymerised in the presence of the prepolymerised catalyst in one or more polymerisation steps. The homo- or copolymerisation of propylene can be conducted in any suitable polymerisation process known in the art, such as in slurry polymerisation or in gas phase polymerisation or in a combination thereof.

Suitable processes for producing the propylene homo- or copolymer (iii) containing the polymeric α-nucleating agent (ii) are disclosed, among others, in WO-A-99/24479, WO-A-00/68315, EP-A-1801157, EP-A-1801155 and EP-A-1818365.

Typically the propylene homo- or copolymer (iii) contains from 0.1 to 200 ppm of the polymeric α-nucleating agent (ii), preferably from 1 to 100 ppm, more preferably from 5 to 50 ppm of the polymeric α-nucleating agent (ii). Also in this embodiment it is preferred that the propylene homo- or copolymer (iii) is a propylene homopolymer, and it is further preferred that the propylene homopolymer has a relatively high content of isotactic material, as indicated, for instance, by a high percentage of cold xylene insoluble material, like at least 96 wt %, or at least 97 wt %, or at least 98 wt %.

Conventional Additives

According to a preferred embodiment of the present invention, the polypropylene composition further comprises
(iv) from 0.01 to 1 wt %, preferably from 0.05 to 0.8 wt %, based on the total weight of the polypropylene composition, of conventional additives.

Hence, the polypropylene composition preferably comprises one or more conventional additives (iv). The conventional additives (iv) used according to the present invention are preferably selected from the group consisting of antioxidants, stabilisers, acid scavengers, and mixtures thereof.

The high isotactic homopolymer of propylene (i) according to the present invention has an isotacticity of from 93 to 98%. It has been found that especially when homopolymers of propylene having an isotacticity of from 95 to 98% are used in making films, the polymer is more prone to degradation than a conventional homopolymer of propylene having an isotacticity of from 90 to 94%. Therefore, more effective stabilisation is preferred for the high isotactic homopolymer of propylene (i).

The antioxidants and stabilisers used in the present invention are preferably selected from the group of hindered phenols and more preferably from the group of hindered phenols not containing phosphorous or sulphur.

The antioxidants and stabilisers used in the present invention are especially preferably one or more compounds selected from the group consisting of 1,3,5-trimethyl-2,4,6-tris(3,5-di-tert-butyl-4-hydroxybenzyl)benzene (sold under trade names Irganox 1330, Anox 330, Ethanox 330 and Kinox-30), pentaerythrityl-tetrakis(3-(3',5'-di-tert. butyl-4-hydroxyphenyl)-propionate (sold under trade names Irganox 1010, Anox 20, Ethanox 310TF and Kinox-10), octadecyl 3-(3',5'-di-tert. butyl-4-hydroxyphenyl)propionate (sold under trade names Irganox 1076, Anox PP 18 and Kinox-16), butylhydroxytoluene (sold under trade names Ionol CP and Vulkanox BHT), 1,3,5-tris(3',5'-di-tert. butyl-4'-hydroxybenzyl)-isocyanurate (sold under trade names Irganox 3114, Anox IC-14, Ethanox 314 and Kinox-34), and 2,5,7,8-tetramethyl-2(4',8',12'-trimethyltridecyl)chroman-6-ol (sold under trade names Irganox E 210 and alpha-tocopherol).

The antioxidants and stabilisers are preferably present in a total amount of from 500 to 8000 ppm, based on the total weight of the polypropylene composition. More preferably, antioxidants and stabilisers are present in a total amount of from 800 to 7000 ppm, still more preferably of from 1000 to 6000 ppm, and in particular from 1500 to 6000 ppm, based on the total weight of the polypropylene composition.

In particular, the antioxidants and stabilisers preferably do not contain phosphorous containing secondary antioxidants, such as tris(2,4-ditert-butylphenyl)phosphite, because such compounds increase the dissipation in the final capacitor.

Acid scavengers are typically salts of organic acids, such as stearates. They have the function of neutralising acids in polymer. Examples of such compounds are calcium stearate, zinc stearate and zinc oxide. Acid scavengers are typically used in an amount of from 50 ppm to 2000 ppm, more preferably from 50 ppm to 1000 ppm.

Polypropylene Composition

The polypropylene composition comprises from 90 to 99.99 wt %, preferably from 90 to 99.9 wt %, more preferably from 95 to 99.9 wt %, and in particular from 99 to 99.9 wt % of the high isotactic homopolymer of propylene (i). In addition the polypropylene composition comprises from 0.0000001 to 1 wt % of a polymeric α-nucleating agent (ii). The polypropylene composition preferably also comprises from 0.01 to 1.0 wt % of conventional additives (iv).

Optionally and preferably, the polypropylene composition comprises up to 9.99 wt % of a propylene homo- or copolymer (iii) other than (i). When present, the propylene homo- or copolymer (iii) preferably comprises the polymeric α-nucleating agent in an amount of from 0.1 to 200 ppm, preferably from 0.5 to 100 ppm, and in particular from 1 to 50 ppm, based on the weight of the propylene homo- or copolymer (iii). The amount of the propylene homo- or copolymer (iii) containing the polymeric α-nucleating agent (ii) is then preferably from 0.1 to 10 wt %, more preferably from 0.1 to 5 wt %, and in particular from 0.1 to 1 wt %.

The polypropylene composition preferably has a melt flow rate $MFR_2$ of from 0.5 to 10 g/10 min, preferably from 1 to 7 g/10 min.

Preferably, the polypropylene composition comprises only linear polypropylene. Thereby, the high isotactic homopolymer of propylene (i) and the propylene homo- or copolymer (iii) do not contain long chain branches. Furthermore, in this connection preferably no further polymer containing long chain branches is added to the polypropylene composition.

Preferably, the polypropylene composition consists of the high isotactic homopolymer of propylene (i) and the polymeric α-nucleating agent (ii), or the polypropylene composition consists of the high isotactic homopolymer of propylene (i), the polymeric α-nucleating agent (ii), and the conventional additives (iv), or the polypropylene composition consists of the high isotactic homopolymer of propylene (i), the polymeric α-nucleating agent (ii), the propylene homo- or copolymer (iii), and the conventional additives (iv), in each case with the amounts given above.

According to an especially preferred embodiment the polypropylene composition comprises, preferably consists of, from 95 to 99.9 wt % of the high isotactic homopolymer of propylene (i), from 0.1 to 5 wt % of the propylene homo- or copolymer (iii) containing the polymeric α-nucleating agent (ii) in an amount of from 0.5 to 100 ppm of the weight of the propylene homo- or copolymer (iii), and from 0.05 to 0.8 wt % of conventional additives (iv).

According to an even more preferred embodiment the polypropylene composition comprises, preferably consists of, from 98.2 to 99.8 wt % of the high isotactic homopolymer of propylene (i), from 0.1 to 1 wt % of the propylene homo- or copolymer (iii) containing the polymeric α-nucleating agent (ii) in an amount of from 0.5 to 100 ppm, or more preferably from 1 to 50 ppm, of the weight of the propylene homo- or copolymer (iii), and from 0.1 to 0.8 wt % of conventional additives (iv).

Biaxially Oriented Polypropylene (BOPP) Film

The biaxially oriented polypropylene film according to the present invention has a dielectric breakdown field strength Eb63.2 of at least 595 kV/mm, which is obtained as the Scale parameter α of a fitted two-parameter Weibull distribution based on 50 results, measured with active electrode area of 2.84 $cm^2$ using 250 V/s DC voltage ramp rate on films with a thickness of 3.8-4.2 μm.

The dielectric breakdown field strength Eb63.2 is preferably at least 600 kV/mm.

The biaxially oriented polypropylene film according to the present invention preferably has a thickness of 2 to 5 μm, preferably between >2 and <5 μm, preferably >2 and 4.5 μm or still more preferably of 3 to 5 μm, yet more preferably of 3.5 to 4.5 μm.

The biaxially oriented polypropylene film according to the present invention will usually have a dielectric breakdown field strength Eb63.2 of not higher than 1000 kV/mm.

Preferably, the biaxially oriented polypropylene film according to the present invention fails with 10 percent cumulative probability (in the remainder Eb10.0) at an applied electric field of at least 535 kV/mm, more preferably of at least 540 kV/mm.

The biaxially oriented polypropylene film according to the present invention will usually have a dielectric breakdown field strength Eb10.0 of not higher than 1000 kV/mm.

The biaxially oriented polypropylene film according to the present invention comprises the polypropylene composition as in detail described above, i.e. the biaxially oriented polypropylene film according to the present invention comprises at least one layer comprising the polypropylene composition as in detail described above and/or the biaxially oriented polypropylene film according to the present invention is stretched simultaneously in machine direction and transverse direction. In addition the film may also include further layers, such as metal layers in case the film is metallised.

Preferably the layer comprising the polypropylene composition contains from 90 to 100 wt % of the polypropylene composition, based on the total weight of the film layer.

More preferably, the layer contains from 95 to 100 wt % of the polypropylene composition and even more preferably from 98 to 100 wt %, such as 99 to 100 wt %. Especially preferably, the film layer consists of the polypropylene composition.

As described above, the film may include additional layers. It is thus possible that the film comprises another layer comprising, for instance, the high isotactic homopolymer of propylene (i). The film may also include a metal layer. Metal layers are present especially if the film is used for making capacitors.

Eventual additional polymer layers may be produced by any means known in the art. Thus, they may be, and they preferably are, coextruded with the film layer according to the present invention. Alternatively, they may be laminated to form the film structure.

The film may also contain, and it preferably contains, a metal layer. The metal layer can be deposited to the film surface in any manner known in the art, such as by electric smelting vacuum deposition, by ion beam vacuum deposition, by sputtering or by ion plating. The thickness of such metal layer is typically from 100 Å (0.01 μm) to 5000 Å (0.5 μm).

Preferably, the biaxially oriented polypropylene film according to the present invention is obtained by orienting the flat film simultaneously in the machine direction and in the transverse direction, more preferably the simultaneous orientation of the flat film in the machine direction and in the transverse direction to obtain the biaxially oriented polypropylene film is conducted in a continuous process, preferably with a throughput of 20 kg/h to 900 kg/h, further preferred >25 kg/h to 500 kg/h. A continuous process according to the invention may thereby be any process that produces product without interruption when running properly and/or does not produce products in batches. A continuous process in the sense of the present invention may thus be seen especially in opposition to a batch process (an example of a batch process may thereby especially be a process carried out with a Bruckner Karo IV laboratory stretcher).

A BOPP film according to the present invention can be prepared by a process as in more detail described below.

Capacitor

The present invention is according to a further aspect directed to a capacitor comprising an insulation film comprising a layer of the biaxially oriented polypropylene film as in detail described above.

Process for Producing a Biaxially Oriented Polypropylene Film

The present invention is according to a further aspect directed to a process for producing a biaxially oriented polypropylene film comprising the steps of:
(A) providing a polypropylene composition comprising
  (i) from 90 to 99.99 wt %, based on the total weight of the polypropylene composition, of a homopolymer of propylene having a content of isotactic pentad fraction of from 93 to 98% and a melt flow rate MFR2 of from 0.4 to 10 g/10 min, and
  (ii) from 0.0000001 to 1 wt %, based on the total weight of the polypropylene composition, of a polymeric α-nucleating agent,
(B) extruding the polypropylene composition to a flat film,
(C) orienting the flat film simultaneously in the machine direction and in the transverse direction to obtain the biaxially oriented polypropylene film, and
(D) recovering the biaxially oriented polypropylene film.

According to a preferred embodiment of the process for producing a biaxially oriented polypropylene film according to the present invention, the polypropylene composition further comprises (iii) up to 9.99 wt %, based on the total weight of the polypropylene composition, of a propylene homo- or copolymer other than the homopolymer of propylene (i).

According to a preferred embodiment of the process for producing a biaxially oriented polypropylene film according to the present invention, the polypropylene composition further comprises (iv) from 0.01 to 1 wt %, based on the total weight of the polypropylene composition, of conventional additives.

As regards the polypropylene composition and its (optional) ingredients, i.e. the high isotactic homopolymer of propylene (i), the polymeric α-nucleating agent (ii), the propylene homo- or copolymer (iii), and the conventional additives (iv), it is referred to the detailed description provided above in connection with the aspect of the present invention directed to a biaxially oriented polypropylene film comprising the polypropylene composition.

According to a preferred embodiment of the process for producing a biaxially oriented polypropylene film according to the present invention, the simultaneous orientation of the flat film in the machine direction and in the transverse direction to obtain the biaxially oriented polypropylene film is conducted in a continuous process.

According to a preferred embodiment of the process for producing a biaxially oriented polypropylene film according to the present invention, the biaxially oriented polypropylene film has a dielectric breakdown field strength Eb63.2 of at least 595 kV/mm, preferably of at least 600 kV/mm, which is obtained as the Scale parameter α of a fitted two-parameter Weibull distribution based on 50 results, measured with active electrode area of 2.84 cm$^2$ using 250 V/s DC voltage ramp rate on films with a thickness of 3.8-4.2 μm, preferably has a dielectric breakdown field strength Eb10.0 of at least 535 kV/mm, more preferably of at least 540 kV/mm, and preferably has a thickness of 2 to 5 μm, still more preferably of 3 to 5 μm, yet more preferably of 3.5 to 4.5 μm.

According to one suitable method a non-oriented film is obtained by extrusion of the polypropylene composition through a flat die and the extrudate is collected and cooled with a rotating chill roll so that the film solidifies.

The chill roll continuously transports the non-oriented film into a tenter frame installed in an oven. The tenter frame is realized by two rails on which clips move in machine direction, driven by a linear motor system. The two rails from entrance to exit of the oven have parallel, diverging and slightly converging mutual arrangement to form a pre-heat, draw and relaxation zone. The biaxial drawing of the non-oriented cast film is accomplished by feeding the non-oriented cast film into the pre-heat zone of the tenter where, at the entrance, the clamps grab the non-oriented cast film on both sides. The movement direction of the clamps is in extrusion, i.e. machine direction (MD), and the clip-to-clip distance in MD is constant in the pre-heat zone. The rail-to-rail distance in the draw zone increases relative to the pre-heat zone to accomplish the transverse direction (TD) drawing of the non-oriented cast film. Simultaneously, the clip-to-clip distance increases in MD to accomplish the MD drawing of the un-oriented cast film, while being oriented in TD. The MD by TD draw ratio can be 6.0 by 6.0 or 6.5 by 6.5 and so on, typical is 6.5 by 6.2 to 6.5 by 8.5. Preferably, the draw ratio in either TD or MD may be for example at least 8.0, preferably >8.0 to 20.0, further preferred 9.0 to 15.0.

For instance, the melt is first extruded through the die to a chill roll. The chill roll surface temperature is held between 10 to 100° C., preferably from 20 to 98° C. The thickness of the sheet is from 50 to 1000 m, preferably from 100 to 500 m.

The film is then passed to the tenter frame and drawn as described above. The tenter oven temperature is set to a temperature between 160-175° C.

The biaxially oriented film is collected on a mandrel before which it is trimmed at both sides to remove the non-oriented edges where the clips held the film.

Use of BOPP Film as Layer of an Insulation Film of a Capacitor

The present invention is according to a further aspect directed to the use of a biaxially oriented polypropylene film of the present invention as in detail described above as layer of an insulation film of a capacitor.

It is believed that the particular high dielectric breakdown field strength Eb63.2 of the biaxially oriented polypropylene film of the present invention is the result of the particular polypropylene composition and the simultaneous orientation of the film, preferably conducted in a continuous process.

Dielectric Breakdown Measurement

General

The dielectric breakdown strength $E_b$, or field (kV/mm), is a property of gases, liquids and solids. When the electric field exceeds $E_b$, breakdown occurs by a discharge channel through the material, connecting the electrodes. In solids, the discharge destroys the material irreversibly, while in gases and liquids damage is temporary and reversible.

Generally, a breakdown event occurs with a high randomness, i.e. when identical specimens are tested to establish the breakdown distribution (see details below), high data dispersion is observed and often the data are not normal distributed (see Dissado L. A.; Fothergill J. C. "Electrical degradation and breakdown in polymers", IEEE Materials and Devices Series 9, Peter Peregrinus Ltd., 1992). The reason for the random occurrence of breakdown events is the unspecific and localized breakdown initiation, at sites of electric field enhancement and sites of low breakdown strength (see Dissado L. A.; Fothergill J. C. "Electrical degradation and breakdown in polymers", IEEE Materials and Devices Series 9, Peter *Peregrinus* Ltd., 1992). Generally, structural heterogeneities of the material, inclusions of contaminants or voids (see Chen G.; Davies A. E. The influence of defects on the short-term breakdown characteristics and long-term dc performance of LDPE insulation. *IEEE Transactions on Electrical Insulation,* 2000, 7, 401-407) and surface roughness (see Rytoluoto I.; Gitsas A.; Pasanan S.; Lahti K. Effect of film structure and morphology on the dielectric breakdown characteristics of cast and biaxially oriented polypropylene films. *European Polymer Journal,* 2017, 95, 606-624) can be potential sites of breakdown and they are inevitable in industrial production.

Breakdown Testing

Breakdown strength of solids is commonly tested in a short voltage ramp test, by sandwiching a thin specimen (plate, sheet or film) between electrodes and increasing the voltage (linearly, exponentially, in steps, etc.) until breakdown occurs which gives the breakdown voltage (kV) of the specimen (see IEC 60234-1 (2013)—Electric strength of insulating materials—Test methods—Part 1: Tests at power frequencies). One then measures the thickness of the specimen at the breakdown spot to obtain breakdown strength $E_b$ (kV/mm). This test is repeated on identically prepared specimens of the material to obtain the breakdown distribution of the material (see Rytoluoto I.; Gitsas A.; Pasanan S.; Lahti K. Effect of film structure and morphology on the dielectric breakdown characteristics of cast and biaxially oriented polypropylene films. *European Polymer Journal*, 2017, 95, 606-624).

Statistical Evaluation

A breakdown distribution obtained from a voltage ramp test typically does not follow a Normal distribution, but rather an extreme value distribution of which the Weibull distribution is commonly used (see Dissado L. A.; Fothergill J. C. "Electrical degradation and breakdown in polymers", IEEE Materials and Devices Series 9, Peter Peregrinus Ltd., 1992, and IEC 62539 (2007)—Guide for the statistical analysis of electrical insulation breakdown data). The Weibull distribution, as originally proposed, uses three parameters, namely the Scale parameter α, the Shape parameter β and the location parameter δ. The Scale parameter α is the average of the Weibull distribution, used in analogy, but not equivalent to, the mean of a Normal distribution. While the mean is the $50^{th}$ percentile of the Normal distribution, the Scale parameter α is the $63.2^{th}$ percentile of the Weibull distribution. When the breakdown strength of a material is meant, most authors inherently refer to the Scale parameter α. The Shape parameter β, as the name suggests, affects the shape of the Weibull distribution, which can look like an exponential distribution for low β or nearly bell shaped like the Normal distribution, for high β. As such high β implies low dispersion and bell shape. The location parameter δ is a "shift constant", as it moves the experimental distribution to the origin, i.e. failure probability is zero when Eb–δ=0. However, δ is often not required, assumed zero, and authors apply the Weibull distribution with two parameters, i.e. only using α and β.

Measurement Details

Measured breakdown strength and breakdown distribution are influenced by several experimental details such as use of direct or alternating current (Krentz T.; Khani M. M.; Bell M.; Benicewicz B. C.; Nelson J. K.; Zhao S.; Schadler L. S. Morphologically dependent alternating-current and direct-current breakdown strength in silica-polypropylene nanocomposites. *Journal of Applied Polymer Science*, 2017, 134) and voltage ramp rate (Rytoluoto I.; Ritamäki M.; Lahti K.; Karttunen M. Ramp rate effect on the breakdown response of $SiO_2$—BOPP Nano composites, *IEEE International conference on the properties of applications of dielectric materials*, 2015, 496-499). One further important experimental detail is the measured volume. Specimen thickness and (electrode) area influence breakdown strength (see Laihonen S. J. et al. "Area dependence of breakdown strength of polymer films: automatic measurement method." *IEEE Transactions on dielectrics and electrical insulation*, 2007, 14, 263-274, and Rytoluoto I.; Lahti K. Effect of film thickness and electrode area on the dielectric breakdown characteristics of metallized film capacitor films, $23^{rd}$ *Nordic Insulation Symposium (Nordis 13)*, 2013, 33-38), and need to be reported with the breakdown results.

Linked to the volume effect on breakdown strength is the electrode geometry such as shape and size. Typical electrode geometries include parallel plate-plate, cylinder-plate and sphere-plate designs. In the latter, the active electrode area is just the contact area between sphere and specimen, hence the stressed active area of the specimen is far smaller than the electrode diameter. Moreover, breakdowns via the air gap between electrode and film outside the contact area can occur, affecting breakdown statistics.

Next to the electrode designs, the data acquisition technique plays a role, such as how many specimens are tested to establish the breakdown distribution. In general, the more specimens are tested, the more extreme results will be found, i.e. more of the very low $E_b$ and the very high $E_b$ will be measured and this will affect the breakdown distribution.

In the common voltage ramp test described above, specimens are broken down individually and subsequently. Each new specimen is subjected to a new voltage ramp starting from zero voltage, and breakdown will always occur at the weakest spot of the specimen, which will stop the voltage ramp. Even if the specimen has stronger spots, they are not measured, i.e. the strongest parts of the specimen, and typically of the material, are not tested. While the more specimens are tested, the higher the chance that also high breakdown strength results are included in the distribution, this individual specimen-by-specimen method biases the breakdown distribution towards lower breakdown strengths.

Advanced automated breakdown measurement methods exist (see Boggs S. A.; Ho J.; Jo T. R.; Overview of Laminar Dielectric Capacitors, Electrical Insulation Magazine, 2010, 26, 7-13, and Rytoluoto I.; Lahti K. New approach to evaluate area-dependent breakdown characteristics of dielectric polymer films, *Transactions on Dielectrics and Electrical Insulation*, 2013, 20, 937-946, and Kerwien C. M.; Malandro D. L.; Broomall J. R., Large area DC dielectric breakdown voltage measurement of BOPP and PTFE thin films, IEEE Conference on Insulation and Dielectric Phenomena, 2016, 486-489, and Laihonen S. J. et al. "Area dependence of breakdown strength of polymer films: automatic measurement method." *IEEE Transactions on dielectrics and electrical insulation*, 2007, 14, 263-274) of which one sub-type measures all individual breakdowns in one voltage ramp (multiple breakdowns) on the same specimen (area) i.e. the full breakdown distribution (see Boggs S. A.; Ho J.; Jo T. R.; Overview of Laminar Dielectric Capacitors, Electrical Insulation Magazine, 2010, 26, 7-13 and Rytoluoto I.; Lahti K. New approach to evaluate area-dependent breakdown characteristics of dielectric polymer films, *Transactions on Dielectrics and Electrical Insulation*, 2013, 20, 937-946). By this method, after the weaker parts of the specimen have broken down, stronger parts of the specimen break down as the voltage keeps rising. Consequently, breakdown distributions obtained by such a test usually include very high breakdown strengths and thus this method biases the breakdown distribution towards higher breakdown strengths than the manual individual method.

In summary, when reporting breakdown data, direct comparison is possible between materials using the same test method, area, voltage ramp rate and same statistical evaluation, but comparisons between different tests are not possible.

In the following the present invention is further illustrated by means of examples.

EXAMPLES

1. Definitions/Measuring Methods

The following definitions of terms and determination methods apply for the above general description of the invention as well as to the below examples unless otherwise defined.

Melt Flow Rate

Melt flow rate $MFR_2$ was determined according to ISO 1133 at 230° C. under a load of 2.16 kg.

Quantification of Microstructure by NMR Spectroscopy

Quantitative nuclear magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

Approximately 200 mg of material (propylene homopolymer) was dissolved in 1,2-tetrachloroethane-d2 (TCE-d2). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, 15 B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251). By pentad isotacticity is meant the fraction of isotactic pentads (mmmm).

Ash Content

The ash content of the polymer was determined by combusting the polymer in a weighed platinum crucible. About 100 grams of polymer is weighed into the crucible. The crucible is then heated in a Bunsen burner flame so that the polymer slowly burns. After the polymer is completely burned the crucible is cooled, dried and weighed. The ash content is then the weight of the residue divided by the weight of the polymer sample. At least two measurements are made and if the difference between the measurements is more than 7 ppm then a third measurement is made.

Polydispersity Index, PI

Dynamic rheological measurements were carried out with Rheometrics RDA-II QC on compression moulded samples under nitrogen atmosphere at 200° C. using 25 mm-diameter plate and plate geometry. The oscillatory shear experiments were done within the linear viscoelastic range of strain at frequencies from 0.01 to 500 rad/s according to ISO 6721-10. The values of storage modulus (G'), loss modulus (G"), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

$$\eta'=G''/\omega \text{ and } \eta''=G'/\omega$$

$$f'(\omega)=G''(\omega)*\omega/[G'(\omega)^2+G''(\omega)^2]$$

$$f''(\omega)=G'(\omega)*\omega/[G'(\omega)^2+G''(\omega)^2]$$

$PI=10^5/G_c$, is calculated from the cross-over point of $G'(\omega)$ and $G''(\omega)$, for which $G'(\omega_c)=G''(\omega_c)=G_c$ holds.

Variations in PI are typically obtained by changing hydrogen feed (chain transfer agent).

Breakdown Test and Electrode Design

The breakdown voltage (BDV) was determined in general agreement with DIN IEC 60243-2 using direct current (DC), voltage ramp rate of 250 V/s and active electrode area of 2.84 cm² which follows from the cylindrically shaped electrode diameter (2.5 cm) reduced by 0.6 cm because of a 0.3 cm edge radius (Cylinder/Plate setup of IEC 60243-1 and-2, see FIG. 1A). The IEC 60243-2 standard electrode design was used with the modification of placing the BOPP film between the upper cylinder electrode and a pad foamed elastomer wrapped with alumina foil placed on the ground electrode (see FIG. 1B).

Accordingly, FIGS. 1A and 1B show IEC 60243-1 and-2 electrode design and the modified variant used herein, respectively.

On each BOPP film, the breakdown strength was measured 50 times as described in the following. The 50 breakdown measurements were distributed over a BOPP film area of approximately 2.5 m² by measuring according to a 10×5 grid, i.e. a row of 10 breakdowns across the TD width and in total measuring 5 such rows along MD of the BOPP film. To accomplish this measurement plan, BOPP film specimens were cut from the 50 grid positions, and broken down individually with the electrode design as described above. The film side opposite of the chill roll was facing the upper electrode. Breakdowns outside the active electrode area via a spark were discarded. After a breakdown had occurred the film thickness was measured three times around the breakdown hole and averaged. The breakdown (field) strength $E_b$ (kV/mm) is voltage at breakdown (kV) divided by averaged specimen thickness d (mm).

Statistical Evaluation

To evaluate a breakdown distribution, DBD, IEC 62539 recommends extreme value distributions, such as the two-parameter Weibull distribution (2-Weibull), the 3-parameter Weibull distribution (3-Weibull), the lognormal distribution and the $1^{st}$ asymptotic extreme value distribution (1AEV). Generally, when the breakdown mechanism is not known, a statistical distribution is primarily chosen via fitting quality. However, most authors use the Weibull distribution, of which the cumulative density distribution function for the three-parameter variant is given by equation 1:

Equation 1

$$F(E_b) = 1 - \exp\left\{-\left[\frac{E_b - \delta}{\alpha}\right]^\beta\right\}$$

Cumulative density function of
the Weibull distribution with three
parameters $\alpha$ (Scale), $\beta$ (Shape) and $\delta$ (Location)

Equation 2

$$F(E_b) = 1 - \exp\left\{-\left[\frac{E_b}{\alpha}\right]^\beta\right\}$$

Cumulative density function of the
Weibull distribution with two parameters
$\alpha$ (Scale), $\beta$ (Shape)

Therein $F(E_b)$ is the cumulative failure probability at the breakdown field $E_b$, $\alpha$ is the Scale parameter representing the distribution average, $\beta$ is the Shape parameter representing dispersion, and $\delta$ is the location parameter, by some called the threshold parameter. This form of the Weibull distribution (3-Weibull) assumes zero failure probability when the applied field is lower that the threshold, i.e. $F(E_b)=0$, for $E_b<\delta$. This form of the Weibull distribution is rarely used as most authors assume $\delta=0$, i.e. failure can possibly occur at any applied field ($F(E_b)>0$ for $E_b>0$ (Equation 2).

Herein the two parameter Weibull distribution is used and Shape parameter $\alpha$ is reported as Eb63.2 as the (average) breakdown strength of the BOPP film. To obtain Eb63.2 ($\alpha$) a fitting procedure is required, i.e. the two parameters a and β are varied so that the fitted Weibull distribution matches the experimental data best. This procedure can be performed as a general function of graphing software (e.g. Origin) or of statistical software packages (e.g. Minitab).

2. Examples

The following materials and compounds are used in the Examples.

| | |
|---|---|
| iHPP | high isotactic homopolymer of propylene, produced according to Reference Example 1 of WO 2017/064224. This polymer has polydispersity index PI of 6.1 1/Pa. |
| nPP | nucleated propylene homopolymer, produced according to Reference Example 3 of WO 2017/064224 |
| W | is a variant of iHPP having comparably large polydispersity index PI of 6.6 1/Pa |
| N | is a variant of iHPP having comparably narrow polydispersity index PI of 5.8 1/Pa |

The polypropylene composition of the inventive examples is a melt blend of 99.5 wt % of iHPP and 0.5 wt % of the nPP, in the following referred to as iHPP/α. Comparative examples without nPP are addressed as iHPP, i.e. without "/α".

The polypropylene compositions were extruded through using the pilot scale biaxial orientation line owned and operated by Bruckner Maschinenbau GmbH. Films were extruded at a rate of 35 kg/h onto a chill roll held at 90° C. into sheet of 240 μm thick with chill roll/film speed of 10 m/min. The film was fed at 10 m/min into a tenter frame applying the LISIM® technology, a proprietary technology of Bruckner Maschinenbau GmbH. The film was then conveyed continuously through the tenter frame and oven, i.e. at a MD speed of 10 m/min through the pre-heat zone held at 160-170° C., then conveyed through the draw zone held at 165-175° C. for TD and MD drawing, the former by the TD widening of the frame, the latter by accelerating the clips in MD to the end MD speed of 60 m/min. The relaxation zone of the tenter was held at the same temperature as the draw zone. The engineering draw ratio in MD and TD was 6.5 by 9.0.

For comparison, also sequential orientation to obtain a BOPP film was applied which was done on the same BOPP line as the LISIM® process including a MDO (machine direction orientation) unit installed between the cast film extrusion and the tenter frame. Films were extruded at a rate of 35 kg/h onto a chill roll held at 90° C. into sheet of 240 μm thick with chill roll/film speed of 10 m/min. This cast film was continuously fed into the MDO unit which consisted of 12 rolls, of which the first six were heated from 95 to 130° C. to pre-heat the film, the subsequent two were held at 140° C. for drawing and the last four are held between 110-124° C. for annealing. The MD draw step was accomplished between the $8^{th}$ and $9^{th}$ roll, running rolls 9 to 12 at 50 m/min thereby creating the MDO or MD drawn film. The MDO film was continuously fed into the tenter frame using 180-175° C. for pre-heating, 175-165° C. for drawing and 165-170° C. for relaxation. In the tenter operation, the MD clip-to-clip distance was constant and the MDO film was only drawn in TD in the diverging draw zone of the tenter. The engineering draw ratio in MD and TD was 5.0 by 9.0.

The obtained BOPP films are in the following referred to as "SIM" for simultaneous orientation, and "SEQ" for sequential orientation, e.g. "SIM6.5×9.0" for a draw ratio of 6.5 in machine direction and a draw ratio of 9.0 in transverse direction.

All tested BOPP films had a thickness of 3.8 μm. This thickness is obtained by providing (non-oriented) flat films with different thicknesses and accordingly applying different draw ratios, varying also machine direction (MD) and transverse direction (TD), to obtain BOPP films with the desired thickness of 3.8 μm.

Table 1 shows the dielectric breakdown field strength Eb63.2 and the dielectric breakdown field strength Eb10.0 of the inventive examples (IE) and comparative examples (CE).

FIG. 2 shows the breakdown distribution of Inventive Example 1 as a two-parameter Weibull probability plot: Experimental data (dots), linear regression through the data (solid line) and 95% confidence interval (shaded area limited by dashed lines). Horizontal and vertical lines show $63.2^{th}$ and $10^{th}$ percentile and the corresponding breakdown fields, respectively.

TABLE 1

BOPP films of examples and dielectric breakdown field strength thereof

| | BOPP type | Eb63.2/kV/mm | Eb10.0/kV/mm |
|---|---|---|---|
| IE1 | iHPP/α-SIM6.5 × 9.0 | 603 ± 8 | 545 ± 15 |
| IE2 | iHPP/α-SIM7.5 × 9.0 | 601 ± 10 | 528 ± 20 |
| CE1 | iHPP/α-SEQ5.0 × 9.0 | 575 ± 8 | 518 ± 15 |
| CE2 | iHPP-W-SIM6.5 × 9.0 | 573 ± 10 | 498 ± 25 |
| CE3 | iHPP-N-SEQ5.0 × 9.0 | 567 ± 9 | 502 ± 18 |

As can be taken from Table 1 above, a polymeric α-nucleating agent in the composition and orienting the flat film simultaneously in the machine direction and in the transverse direction to obtain the biaxially oriented polypropylene film allows for the first time achieving rather high values of dielectric breakdown field strength for BOPP films having a thickness of 3.8 μm. If only one (CE1, CE2) or both (CE3) of these features are missing, the values are considerably lower.

As indicated above in more detail, the breakdown test used according to the present invention has the following characteristics, which are different from the prior art and accordingly the obtained values are not comparable:

Individual breakdowns, N=50, using IEC 60243 electrode design (IEC 60243-1 2013, FIG. 1A) with upper active electrode area 2.84 cm² and ground electrode covered by an alumina foil wrapped around a sheet of foamed elastomer (see FIG. 1B) herein). Voltage ramp rate 250 V/s.

Breakdown test and electrode design used in EP 2 995 641 A1:

Rytoluoto I.; Lahti K. New approach to evaluate area-dependent breakdown characteristics of dielectric polymer films, *Transactions on Dielectrics and Electrical Insulation*, 2013, 20, 937-946.

Breakdown test and electrode design used in WO 2017/064224 A1:

Individual breakdowns, N=10, using IEC 60243 electrode design (IEC 60243-1 2013, FIG. 1C), Voltage ramp rate 250 V/s.

The invention claimed is:

1. A biaxially oriented polypropylene film, comprising a polypropylene composition, wherein the polypropylene composition comprises:
   (i) from 90 to 99.99 wt %, based on the total weight of the polypropylene composition, of a homopolymer of propylene having a content of isotactic pentad fraction of from 93 to 98% and a melt flow rate $MFR_2$ of from 0.4 to 10 g/10 min, and
   (ii) from 0.0000001 to 1 wt %, based on the total weight of the polypropylene composition, of a polymeric α-nucleating agent,
   wherein the biaxially oriented polypropylene film has
      a dielectric breakdown field strength Eb63.2 of at least 595 kV/mm, which is obtained as the Scale parameter α of a fitted two-parameter Weibull distribution based on 50 results, measured with active electrode area of 2.84 cm² utilizing 250 V/s DC voltage ramp rate on films with a thickness of 3.8-4.2 μm, and
      a thickness of 2 to 5 μm, wherein further the film is stretched simultaneously in machine direction and transverse direction.

2. The biaxially oriented polypropylene film according to claim 1, wherein the polypropylene composition further comprises:
   (iii) up to 9.99 wt %, based on the total weight of the polypropylene composition, of a propylene homo- or copolymer other than the homopolymer of propylene (i).

3. The biaxially oriented polypropylene film according to claim 1, wherein the polypropylene composition further comprises:
   (iv) from 0.01 to 1 wt %, based on the total weight of the polypropylene composition, of additives.

4. The biaxially oriented polypropylene film according to claim 1, wherein the polypropylene composition has an ash content of not more than 30 ppm and/or the draw ratio in either TD or MD is at least 8.0.

5. The biaxially oriented polypropylene film according to claim 1, wherein the polymeric α-nucleating agent is selected from the group consisting of polyvinylcyclohexane, poly(3-methyl-1-butene) and mixtures thereof.

6. The biaxially oriented polypropylene film according to claim 1, wherein the additives are selected from the anti-oxidants, stabilisers, acid scavengers, and mixtures thereof.

7. The biaxially oriented polypropylene film according to claim 1, wherein the film comprises a layer consisting of the polypropylene composition and/or the film has a thickness between >2 and <5 μm.

8. The biaxially oriented polypropylene film according to claim 1, wherein the film also comprises a metal layer.

9. The biaxially oriented polypropylene film according to claim 1, having a dielectric breakdown field strength Eb10.0 of at least 535 kV/mm.

10. A capacitor comprising an insulation film comprising a layer of the biaxially oriented polypropylene film according to claim 1.

11. A process for producing a biaxially oriented polypropylene film comprising the steps of:
   (A) providing a polypropylene composition comprising:
      (i) from 90 to 99.99 wt %, based on the total weight of the polypropylene composition, of a homopolymer of propylene having a content of isotactic pentad fraction of from 93 to 98% and a melt flow rate MFR2 of from 0.4 to 10 g/10 min, and
      (ii) from 0.0000001 to 1 wt %, based on the total weight of the polypropylene composition, of a polymeric α-nucleating agent,
   (B) extruding the polypropylene composition to a flat film,
   (C) orienting the flat film simultaneously in the machine direction and in the transverse direction to obtain the biaxially oriented polypropylene film, and
   (D) recovering the biaxially oriented polypropylene film.

12. The process according to claim 11, wherein the polypropylene composition further comprises:
   (iii) up to 9.99 wt %, based on the total weight of the polypropylene composition, of a propylene homo- or copolymer other than the homopolymer of propylene (i).

13. The process according to claim 11, wherein the polypropylene composition further comprises:
   (iv) from 0.01 to 1 wt %, based on the total weight of the polypropylene composition, of conventional additives.

14. The process according to claim 11, wherein simultaneous orientation of the flat film in the machine direction and in the transverse direction to obtain the biaxially oriented polypropylene film is conducted in a continuous process with a throughput of 20 kg/h to 900 kg/h, and the draw ratio in either TD or MD is at least 8.0.

15. The process according to claim 11, wherein the biaxially oriented polypropylene film has:
   a dielectric breakdown field strength Eb63.2 of at least 595 kV/mm, which is obtained as the Scale parameter a of a fitted two-parameter Weibull distribution based on 50 results, measured with active electrode area of 2.84 cm² using 250 V/s DC voltage ramp rate on films with a thickness of 3.8-4.2 μm,
   a dielectric breakdown field strength Eb10.0 of at least 535 kV/mm, and
   a thickness of 2 to 5 μm.

* * * * *